(12) United States Patent
Wakitani et al.

(10) Patent No.: US 6,798,160 B2
(45) Date of Patent: Sep. 28, 2004

(54) ELECTRIC WORKING MACHINE

(75) Inventors: Tsutomu Wakitani, Wako (JP); Tsutomu Inui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/253,832

(22) Filed: Sep. 24, 2002

(65) Prior Publication Data

US 2003/0085680 A1 May 8, 2003

(30) Foreign Application Priority Data

Nov. 2, 2001 (JP) ........................................ 2001-337465
Nov. 28, 2001 (JP) ........................................ 2001-362781

(51) Int. Cl.[7] ................................................ H02P 7/00
(52) U.S. Cl. ...................... 318/432; 318/135; 318/163; 318/772; 318/268; 318/461
(58) Field of Search ......................... 318/66, 135, 139, 318/163–164, 772, 778–779, 268, 272, 432–433, 461

(56) References Cited

U.S. PATENT DOCUMENTS

| | | | | | |
|---|---|---|---|---|---|
| 3,795,285 | A | * | 3/1974 | Scholl et al. ................ | 318/621 |
| 3,814,199 | A | * | 6/1974 | Jones .......................... | 318/587 |
| 4,387,325 | A | * | 6/1983 | Klimo .......................... | 318/71 |
| 5,350,982 | A | * | 9/1994 | Seib ............................. | 318/139 |
| 5,644,202 | A | * | 7/1997 | Toriyama et al. ........... | 318/369 |
| 5,818,189 | A | * | 10/1998 | Uchiyama et al. .......... | 318/488 |
| 6,020,701 | A | * | 2/2000 | Ishida ......................... | 318/362 |
| 6,230,831 | B1 | * | 5/2001 | Ogata et al. ................. | 318/445 |
| 6,359,403 | B1 | * | 3/2002 | Pollklas et al. .............. | 318/432 |

FOREIGN PATENT DOCUMENTS

| | | |
|---|---|---|
| JP | 48004260 | 2/1973 |
| JP | 05070101 | 9/1993 |
| JP | 09284991 | 10/1997 |

* cited by examiner

*Primary Examiner*—Marlon Fletcher
(74) *Attorney, Agent, or Firm*—Adams & Wilks

(57) ABSTRACT

An electric working machine has an electric motor and a speed adjustment member for undergoing movement within a range of positions including a low speed range position in which the electric working machine travels at a low speed, a high speed range position in which the electric working range position in which the electric working machine travels at a speed intermediate of the low speed and the high speed. A potentiometer receives a voltage which varies in dependence on the position of the speed adjustment member within the range of positions. A control unit controls the electric motor in accordance with the variation of the voltage received by the potentiometer to vary a travel speed of the electric working machine so that a rate of change of the travel speed of the electric working machine is smaller when the speed adjustment member is in the intermediate speed range position than when the speed adjustment member is in each of the low speed range position and the high speed range position.

12 Claims, 12 Drawing Sheets

ELECTRIC WORKING MACHINE

FIELD OF THE INVENTION

The present invention relates to an electric working machine including electric motors, a movable speed adjustment member, a potentiometer for producing a voltage variable in response to the movement of the member, and a control unit for controlling the electric motors on the basis of the voltage to thereby change a velocity of the electric working machine.

BACKGROUND OF THE INVENTION

Known electric working machines include electric motors and motor drivers for driving the motors. Most of the electric motors include controllers for controlling the motors through the motor drivers to prevent the motors from being placed under an overload. Such electric working machines are disclosed in, for example, Japanese Patent Kokai (Laid-Open) Publication No. HEI 9-284991 entitled "MOTOR PROTECTOR FOR SELF-PROPELLED TRAVEL DEVICE" and Japanese Utility Model Laid-Open Publication No. HEI 5-70101 entitled "OVERLOAD PREVENTING APPARATUS FOR UNMANNED CONVEYOR".

The electric working machine disclosed in the publication No. HEI 9-284991 includes an electric motor, a detection circuit for detecting current flowing through the motor, an alarm lamp, and an alarm buzzer. When the current flowing through the motor exceeds a previously set value, the lamp flashes or otherwise is lit while the buzzer produces an alarm. If the current is maintained above the set value for a given period of time, the motor comes out of operation. Consequently, the working machine stops traveling.

The electric working machine disclosed in the publication No. HEI 5-70101 includes a controller, a traveling indicator, electric motors, and detectors for detecting speeds of the electric motors to provide signals indicative of the motor speeds. The traveling indicator provides a signal indicative of a previously set velocity of the motors. If the signal(s) which the detector(s) provide become greater in level than the signal from the traveling indicator in a short time, the controller judges the motor(s) to be placed under an overload to thereby bring the same out of operation. As a result, the working machine stops traveling.

The working machines as disclosed in the above publications are designed such that, when placed under the overload, the motors come out of operation for the purpose of protection. This is advantageous because electric components associated with the motors can be protected as well.

For some application, however, it may be preferred for the aforementioned working machine to rather keep traveling than stop traveling even if the motor is placed under the overload.

Japanese Patent Kokoku (Post-Exam) Publication No. SHO-48-4260 entitled "CONTROLLER FOR PROPELLING ELECTRIC VEHICLE AND DETERMINING DIRECTION OF PROPULSION THEREOF" discloses an electric vehicle including a controller. The controller includes an operational lever, batteries, potentiometers, and electric motors. The batteries apply voltages to the potentiometers. When the lever is manipulated, sliding contacts of the potentiometers are caused to move. The movement of the sliding contacts controls the electric motors. More specifically, a direction of rotation of the motor depends upon which side of a resistor of each potentiometer the sliding contact is positioned on. A velocity of the electric vehicle depends upon where the sliding contacts are positioned.

The velocity of the vehicle depends upon where the sliding contacts are positioned. Thus, how the velocity of the vehicle varies depends upon resistances of the resistors of the potentiometers.

For some application, however, the electric vehicle may be easy to operate if it provides its velocity variable in small increments or decrements when traveling fast or otherwise slowly. Contrarily, it may be often preferred for the electric vehicle to change in velocity in large increments or decrements when traveling fast or otherwise slowly. The electric vehicle is desirably changed in velocity in small increments or decrements especially when traveling within a range of velocity an operator often selects.

SUMMARY OF THE INVENTION

An object of the present invention is to provide an electric working machine including electric motors designed to keep operating even after coming out of an overload state.

A further object of the present invention is to provide an electric working machine designed to vary in velocity in small increments or decrements when traveling within a range of velocity an operator frequently selects.

According to one aspect of the present invention, there is provided an electric working machine comprising: drive wheels; electric motors for driving the drive wheels; a speed adjustment member movable within a range including a neutral range, a working low speed range, a working middle speed range, and a high speed traveling range; a potentiometer having a voltage applied thereto, the voltage varying in response to the movement of the speed adjustment member; a control unit for controlling the electric motors by means of motor drivers on the basis of the voltage applied to the potentiometer; and the electric working machine stopping traveling when the speed adjustment member is in the neutral range, the electric working machine traveling at a low velocity while performing a predetermined operation when the speed adjustment member is in the working low speed range, the electric working machine traveling at a middle velocity while performing the predetermined operation when the speed adjustment member is in the working middle speed range, the electric working machine traveling without performing the predetermined operation when the speed adjustment member is in the high speed traveling range.

The speed adjustment member may be rotational one having a pointer. In such a case, the member rotates to move the pointer within the respective ranges. Alternatively, the speed adjustment member may include plural buttons corresponding to the respective ranges.

In a preferred form of the present invention, the velocity of the electric working machine varies more gradually when the speed adjustment member moves in the working middle speed range than when the speed adjustment member moves in the working low speed range and the high speed traveling range.

The working middle speed range provides velocities that are more frequently chosen by the operator than other ranges. Moving the speed adjustment member within the working middle speed range varies the velocity of the electric working machine in small increments or decrements. This is advantageous in that the working machine performs the predetermined or required operation with increased precision.

In a further preferred form of the present invention, the control unit including: a stop section for issuing to the motor drivers a current carrying stop command for stopping carrying currents to the electric motors when current(s) flowing through the electric motor(s) exceed an upper limit threshold level; a restart section for issuing to the motor drivers a current carrying start command for carrying currents to the electric motors to prevent the current(s) flowing through the electric motor(s) from falling to zero after issuance of the current carrying stop command; and a repetition section for repeating the issuance of the current carrying stop command and the issuance of the current carrying start command.

Generally, after the carrying of current to an electric motor is stopped, under the influence of inductance of a coil of the motor, it takes a little time (about 1 m sec.) for the current flowing through the motor to drop to 0 (A). The present invention advantageously utilizes such an electric motor.

As is apparent from the foregoing description, after issuing the current carrying stop command with the motor(s) placed under an overload, the control section issues the current carrying start command to prevent the current (s) flowing through the motor(s) from dropping to 0 (A), such that the carrying of currents to the motors is restarted. With this arrangement, the stopping and restarting of the carry of the currents can alternate at short intervals. Since the control unit starts the carrying of currents to the motors while the current(s) are decreasing from the upper limit threshold level, the current(s) are varied by a limited amount after the motor(s) are brought to the overload state. Consequently, torques produced by the motors is varied to a limited extent. It thus becomes possible to operate the motors, bringing the motor(s) out of the overload state. This enables the snow removing machine to keep traveling.

With this arrangement, excessive current does not flow through the motors and their associated components to protect the motors and the components.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
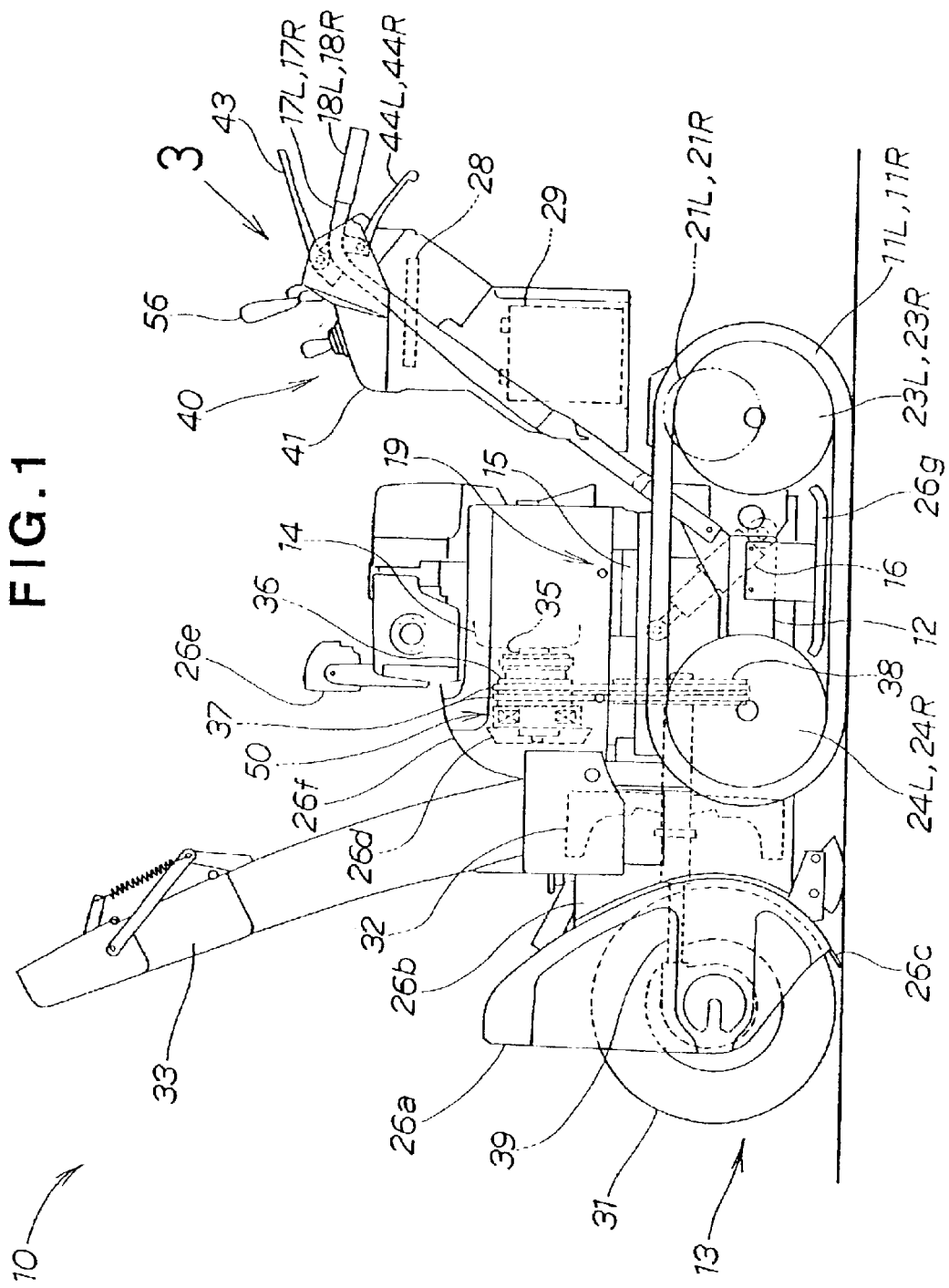
FIG. 1 is a side elevation view of an electric working machine according to a first embodiment of the present invention.

Referring to FIG. 1, there is shown an electric working machine, i.e., a snow removing machine designated generally at 10 according to a first embodiment of the present invention. The snow removing machine 10 includes a frame 12 having right and left endless belts 11R, 11L. The snow removing machine 10 further includes a body frame 15 having a snow removing part 13 and an engine 14 for driving the snow removing part 13. The frame 15 is vertically movably mounted to the frame 12. More specifically, a frame lift mechanism 16 is provided for moving a front part of the frame 15 vertically. The frame 12 has right and left handle bars 17R, 17L extending upwardly rearwardly from a rear part thereof. The handle bars 17R, 17L have grips 18R, 18L, respectively.

The snow removing machine 10 is of walk-behind type. In other words, while the machine 10 travels, an operator walks behind and manipulates the machine 10, grasping the rips 18R, 18L. Between the handle bars 17R, 17L, there are disposed an operation box 41, a control unit 28, and batteries 29, 29 (only one shown). The operation box 41 is positioned above the control unit 28. The control unit 28 is positioned above the batteries 29, 29.

The engine 14 includes a crankshaft 35 having an electromagnetic clutch 50 disposed at one end thereof. The crankshaft 35 has a pulley 36 disposed centrally thereof.

The snow removing part 13 includes an auger 31, a blower 32, and a chute 33 mounted at the front part of the body frame 15. A rotational shaft 39 is provided for rotating the auger 31 and the blower 32.

More specifically, when the clutch 50 transmits a motive power of the crankshaft 35 of the engine 14 to the pulley 36, the pulley 36 is caused to rotate. The belts 37, 37 transmit the rotation of the pulley 36 to a pulley 38. The pulley 38 is thus caused to rotate. The rotational shaft 39 transmits the rotation of the pulley 38 to the auger 31 and the blower 32. The auger 31 is then operated to collect snow and the blower 32 blows the collected snow far away through the chute 33.

Reference numerals 26a, 26b, 26c, 26d, 26e, 26f, 26g denote an auger case, a blower case, a scraper, a generator, a lamp, a cover, a member for pressing the endless belts 11R, 11L against the ground, and a control section or operation part 40 as will be described later. The frames 12, 15 cooperate to constitute a body 19 of the snow removing machine.

Figure 2:
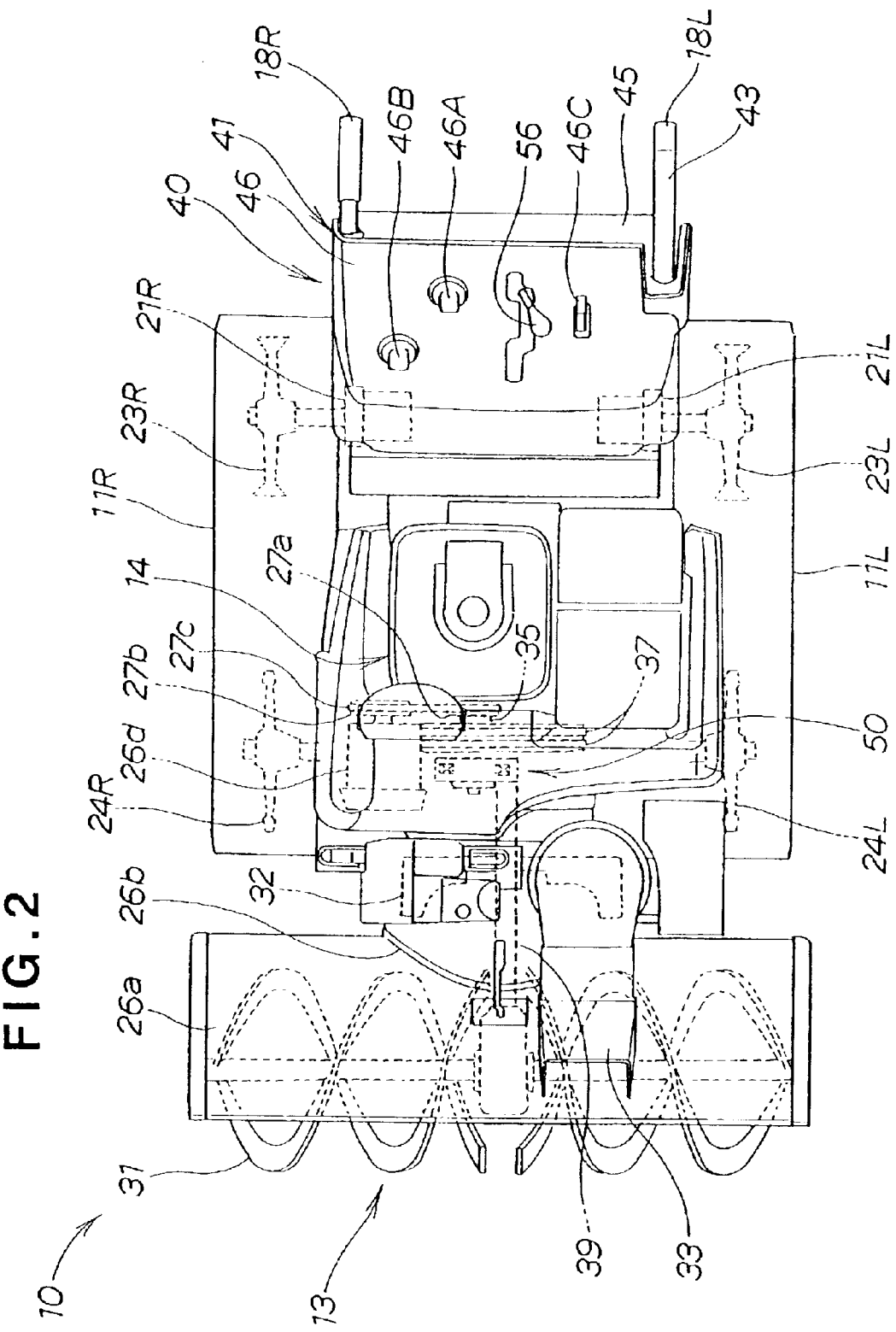
FIG. 2 is a top plan view of the electric working machine of FIG. 1.

Turning to FIG. 2, the right endless belt 11R runs over a right drive wheel 23R and a right driven wheel 24R while the left endless belt 11L runs over a left drive wheel 23L and a left driven wheel 24L. The snow removing machine 10 includes right and left electric motors 21R, 21L for driving the right and left drive wheels 23R, 23L, respectively. The right and left endless belts 11R, 11L have the drive wheels 23R, 23L positioned at rear parts thereof, respectively. Similarly, the right and left driven wheels 24R, 24L are positioned at front parts of the endless belts 11R, 11L, respectively.

The electric motors 21R, 21L rotate to drive the drive wheels 23R, 23L and therefore the endless belts 11R, 11L are driven to propel the snow removing machine 10. The crankshaft 35 protruding from the engine 14 has a pulley 27a mounted thereon. The generator 26d has a pulley 27b mounted thereon. A V-belt 27c runs over the pulleys 27a, 27b. When the crankshaft 35 rotates, the V-belt 27c transmits the rotation of the crankshaft 35 to the generator 26d.

Figure 3:
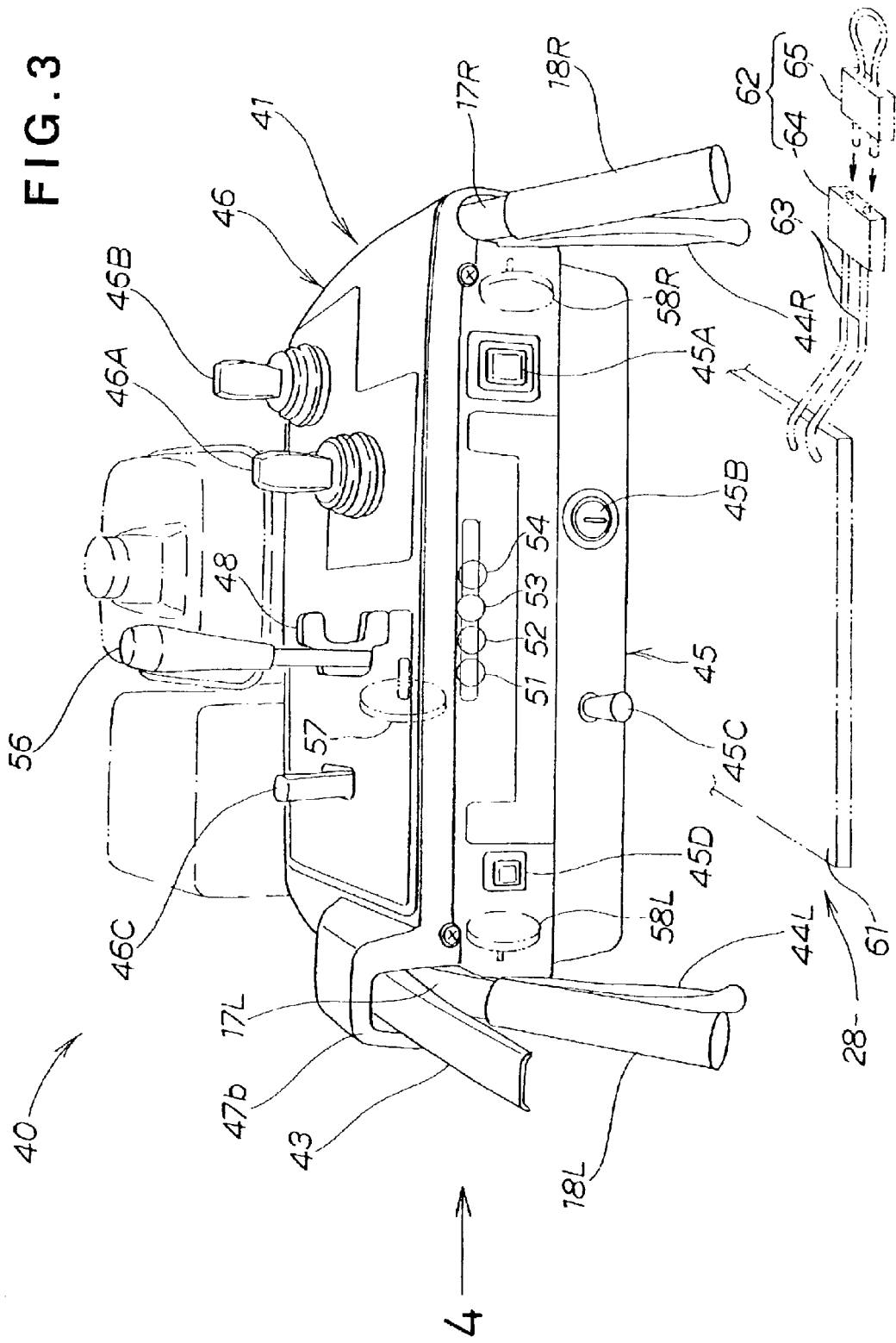
FIG. 3 is a view illustrating an operation part of the electric working machine as viewed in a direction designated at 3.

Reference is made to FIG. 3. The snow removing machine 10 includes the operation part 40. The operation part 40 has the operation box 41 provided between the right and left handle bars 17R, 17L, a travel ready lever 43 for making the machine 10 ready to travel, a left turn lever 44L for turning the machine 10 leftward, and a right turn lever 44R for turning the machine 10 rightward. The lever 43 is provided at the handle bar 17L. The lever 44L is mounted to the handle bar 17L while the lever 44R is mounted to the handle bar 17R.

The operation part 40 includes the control unit 28 and potentiometers 58R, 58L. The potentiometer 58R transmits to the control unit 28 information on the right turn lever 44R while the potentiometer 58L transmits to the control unit 28 information on the left turn lever 44L, as will be described later.

The operation box 41 includes an operation case 45 interposed between the handle bars 17R, 17L, and an operation panel 46 covering the operation case 45.

The operation case 45 includes: (1) an auger switch button 45A for bringing the clutch 50 to an engaged or disengaged state to thereby turn on or off the auger 31, (2) a main switch 45B for starting the engine 14, (3) a choke knob 45C for use in starting the engine 14, (4) an automation setting button 45D arranged such that, when depressed to be lit, a velocity of the snow removing machine 10 is automatically adjusted in correspondence to a load applied to the auger 31, (5) a battery indicator 53 for informing the human operator of abnormality of the battery 29, (6) a generator indicator 54 for warning the human operator of abnormality of the generator 26d, and (7) first and second warning indicators 51, 52 for warning a human operator of various abnormalities occurring in the machine 10.

The operation panel 46 includes a lever 46A for operating the frame lift mechanism 16 to change an orientation of the auger case 26a, a chute operation lever 46B for changing an orientation of the chute 33, a throttle lever 46C for controlling an engine speed of the engine 14, and a speed adjustment lever (a speed adjustment member) 56 not only for adjusting a velocity of the snow removing machine 10 but also for rotating the motors 21R, 21 to advance or otherwise retreat the snow removing machine 10 as will be described later.

The lever 56 includes a potentiometer 57 for informing the control unit 28 of a position of the lever 56. The operation panel 46 has a speed range aperture 48 formed therein. The aperture 48 guides the lever 56 therealong. The control unit 28 includes a control board 61. The control board 61 is connected to an initial switch 62 through lead wires 63, 63. The initial switch 62 includes a connector 64 connected to ends of the lead wires 63, 63, and a coupler 65 detachably attached to the connector 64. Detachment of the coupler 65 from the connector 64 achieves initialization, as will be described later in relation to FIG. 7.

Unlike well-known brake levers, the levers 44R, 44L does not act to completely stop the traveling of the machine 10, when grasped. The levers 44R, 44L, when grasped, act to decrease rotational speeds of the motors, after which the snow removing machine 10 turns rightward or leftward.

When a key (not shown) is inserted into a slit of the main switch 45B and then turned, the engine is started. Pulling the engine choke knob 45C enriches a mixture to be supplied to the engine 14.

Figure 4:
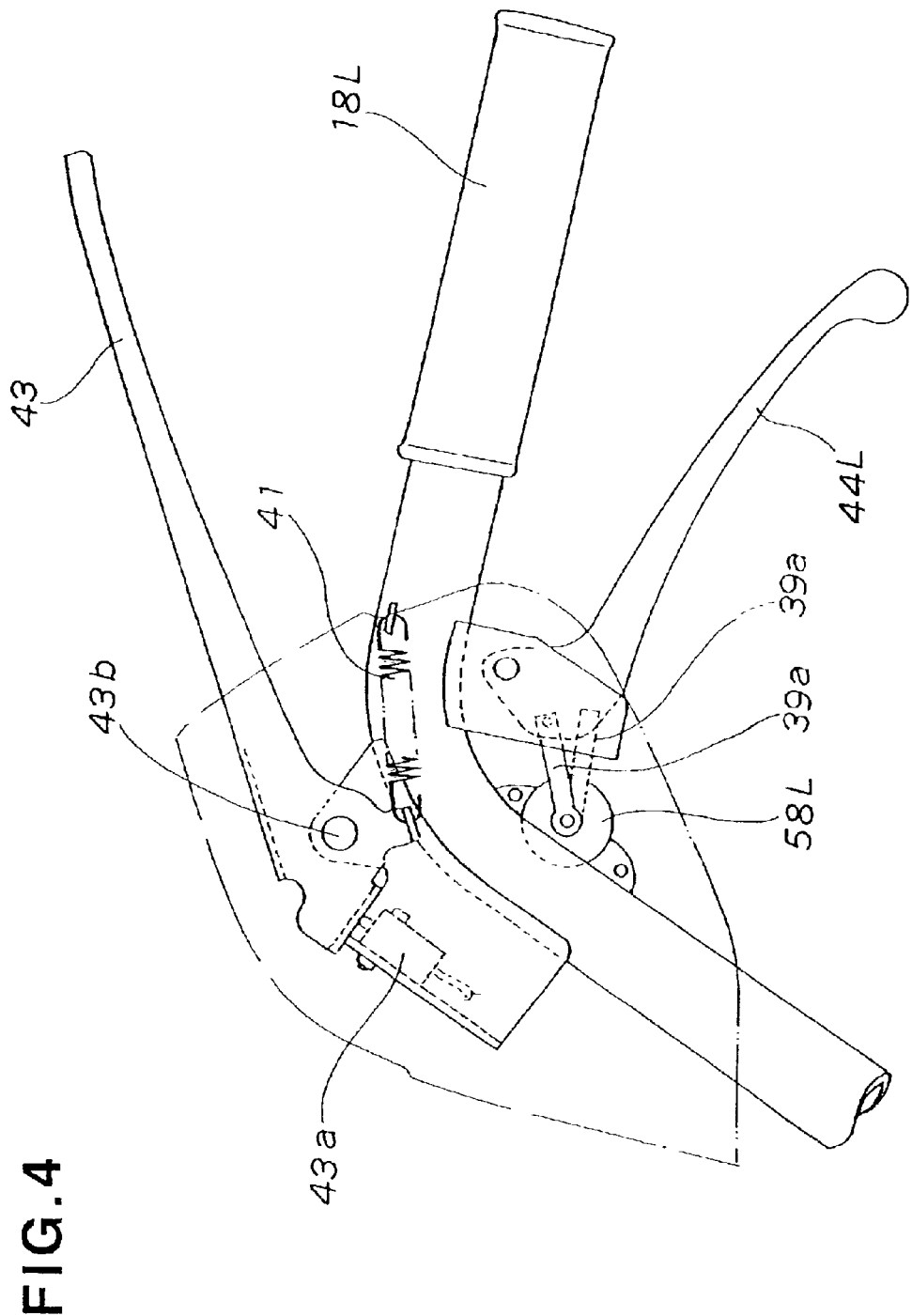
FIG. 4 is a side elevation view of a left turn lever, a left grip, and a travel ready lever of the working machine, as viewed in a direction designated at 4.

Turning to FIG. 4, the lever 43 is pivotable on a shaft 43b mounted in the handle bar 17L. A spring 41 urges the lever 43 in such a direction as to turn the switch 43a off. When a human operator grasps the lever 43 and the grip 18L together with her left hand, that is, the lever 43 is pivoted towards the grip 18L, the switch 43a is turned on. In other words, grasping the lever 43 and the grip 18L together causes the switch 43a to be switched from an OFF state to an ON state. Thereafter, the switch 43a then sends to the control unit 28 a signal indicating that the switch 43a is turned on. Upon receiving such a signal, the control unit 28 recognizes that the snow removing machine 10 is ready to travel. The auger 32 is allowed to rotate while the electric motors 21R, 21L are allowed to rotate. In other words, the lever 43 is manipulated to allow the machine 10 to travel and remove snow. When the human operator takes her or his left hand off the lever 43, the rotation of the auger 32 is stopped. At the same time, the motors 21R, 21L cease rotating. Namely, the lever 43 serves as a dead man's handle.

When the left turn lever 44L and the grip 18L are grasped together, an arm 39a of the potentiometer 58L is caused to pivot to a position as indicated by a phantom line. The potentiometer 58L outputs information on the pivotal movement of the arm 39a.

Referring back to FIG. 3, the right and left turn levers 44R, 44L include the potentiometers 58R, 58L. Grasping the levers 44R, 44L and the grips 18R, 18L together varies voltages applied to the potentiometers 58R, 58L. The control unit 28 is then informed of the change in voltage applied to the potentiometers 58R, 58L to thereby subject the motors 21R, 21L to a regenerative braking, such that the rotational speeds of the motors 21R, 21L are varied to turn the snow removing machine rightward or leftward.

Figure 5:
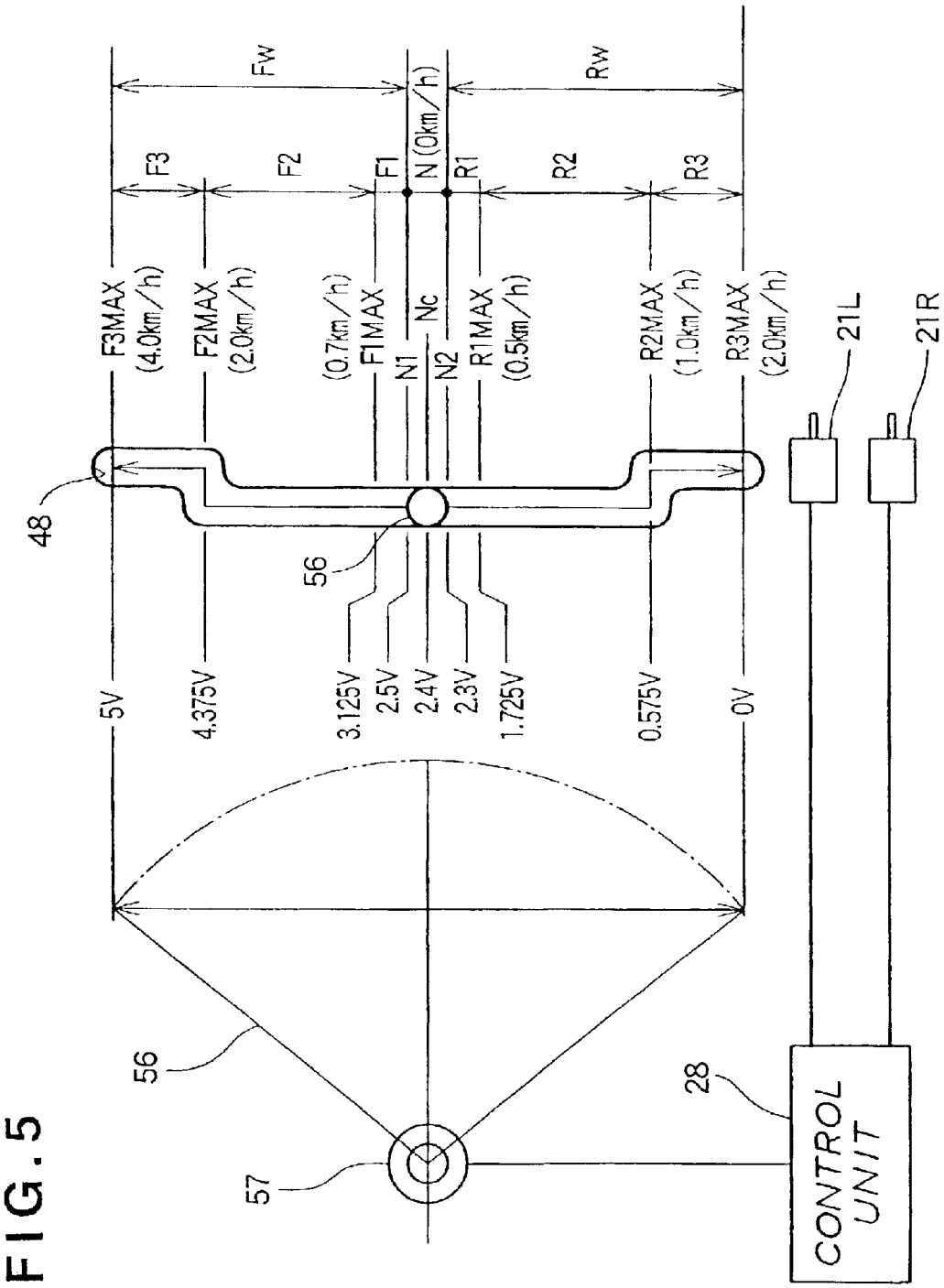
FIG. 5 is a view illustrating how a speed adjustment lever of the electric working machine is operated.

As shown in FIG. 5, the speed range aperture 48 for guiding the speed adjustment lever 56 is elongated or oblong in the form of a crank.

Within the aperture 48, there are provided three regions or ranges, that is, a forward range Fw, a neutral range N, and a reverse range Rw. When the lever 56 is in the forward range Fw, the snow removing machine 10 advances or travels forwardly. When the lever 56 is in the neutral range N, the snow removing machine 10 stops traveling. When the lever 56 is in the reverse range Rw, the snow removing machine 10 retreats or moves backwardly.

More specifically, the forward range Fw includes a high speed traveling range F3, a working middle speed range F2, and a working low speed range F1. When the lever 56 is in the range F3, the snow removing machine 10 travels forwardly at a high velocity. When the lever 56 is in the range F2, the machine 10 travels forwardly at a middle velocity, performing the snow removing operation. When the lever 56 is in the range F1, the machine 10 travels forwardly at a low velocity, performing the snow removing operation. Moreover, when the lever 56 is in a high speed traveling maximum position F3MAX, the machine 10 travels forwardly at the highest one of velocities within the high speed traveling range F3. When the lever 56 is in a working middle speed maximum position F2MAX, the machine 10 removes snow while traveling forwardly at the highest one of velocities within the working middle speed range F2. When the lever 56 is in a working low speed maximum position F1MAX, the machine 10 removes snow while traveling forwardly at the highest one of velocities within the working low speed range F1.

When the lever 56 is at any position within the neutral range N, the machine 10 stops traveling. Within the neutral range N, there are provided a neutral position Nc, an upper limit neutral position N1, and a lower limit neutral position N2.

The reverse range Rw includes a high speed traveling range R3, a working middle speed range R2, and a working low speed range R1. When the lever 56 is in the range R3, the snow removing machine 10 travels backwardly at a high velocity. When the lever 56 is in the range R2, the machine 10 travels backwardly at a middle velocity, performing the snow removing operation. When the lever 56 is in the range R1, the machine 10 travels backwardly at a low velocity, performing the snow removing operation. Moreover, when the lever 56 is in a high speed traveling maximum position R3MAX, the machine 10 travels backwardly at the highest one of velocities within the high speed traveling range R3. When the lever 56 is in a working middle speed maximum position R2MAX, the machine 10 removes snow while traveling backwardly at the highest one of velocities within the working middle speed range R2. When the lever 56 is in a working low speed maximum position R1MAX, the machine 10 removes snow while traveling backwardly at the highest one of velocities within the working low speed range R1.

When in the range F3, therefore, the speed adjustment lever 56 acts to transmit to the control unit 28 information necessary to advance the snow removing machine 10 at a high velocity. When in the range F2, the lever 56 acts to transmit to the control unit 28 information necessary to enable the machine 10 to advance at a middle velocity while performing the snow removing operation. The lever 56, when in the range F1, acts to transmit to the control unit 28 information necessary to enable the machine 10 to advance at a low velocity removing snow. When the lever 56 is in the neutral range N, it acts to transmit to the control unit 28 information necessary to stop the traveling of the machine 10. The lever 56, when in the range R3, acts to transmit to the control unit 28 information necessary to retreat the machine 10 at a high velocity. When in the range R2, the lever 56 acts to transmit to the control unit 28 information necessary to enable the machine 10 to retreat at a middle velocity removing snow. When the lever 56 is in the range R1, it acts to transmit to the control unit 28 information necessary to enable the machine 10 to travel backwardly at a low velocity while performing the snow removing operation.

The potentiometer 57 informs the control unit 28 of a value of voltage applied thereto when the speed adjustment lever 56 is set, for example, in the high speed traveling maximum position F3MAX or R3MAX. On the basis of the value of voltage, the control unit 28 controls rotational speeds of the motors 21R, 21L to determine a velocity of the snow removing machine 10. The voltage appearing at the potentiometer 57 and the velocity of the snow removing machine 10 are, for example, as follows.

When the lever 56 is in the high speed traveling maximum position R3MAX, the potentiometer 57 has no voltage applied thereto to provide the snow removing machine 10 with a velocity of 2.0 (km/h). Likewise, when the lever 56 is in the working middle speed maximum position R2MAX, a voltage of 0.575 (V) is applied to the potentiometer 57 to provide the machine 10 with a velocity of 1.0 (km/h). When the lever 56 is in the working low speed maximum position R1MAX, a voltage of 1.725 (V) is applied to the potentiometer 57 to provide the machine 10 with a velocity of 0.5 (km/h).

When the lever 56 is in the lower limit position N2, a voltage of 2.3 (V) is applied to the potentiometer 57 to provide the snow removing machine 10 with a velocity of 0 (km/h). When the lever 56 is in the neutral position Nc, a voltage of 2.4 (V) is applied to the potentiometer 57 to provide the machine 10 with a velocity of 0 (km/h). When the lever 56 is in the upper limit position N1, a voltage of 2.5 (V) is applied to the potentiometer 57 to provide the machine 10 with a velocity of 0 (km/h).

When the lever 56 is in the working low speed maximum position F1MAX, a voltage of 3.125 (V) is applied to the potentiometer 57 to provide the machine 10 with a velocity of 0.7 (km/h). When the lever 56 is in the working middle speed maximum position F2MAX, a voltage of 4.375 (V) is applied to the potentiometer 57 to provide the machine 10 with a velocity of 2.0 (km/h). When the lever 56 is in the high speed traveling maximum position F3MAX, a voltage of 5 (V) is applied to the potentiometer 57 to provide the machine 10 with a velocity of 4.0 (km/h).

Figure 6:
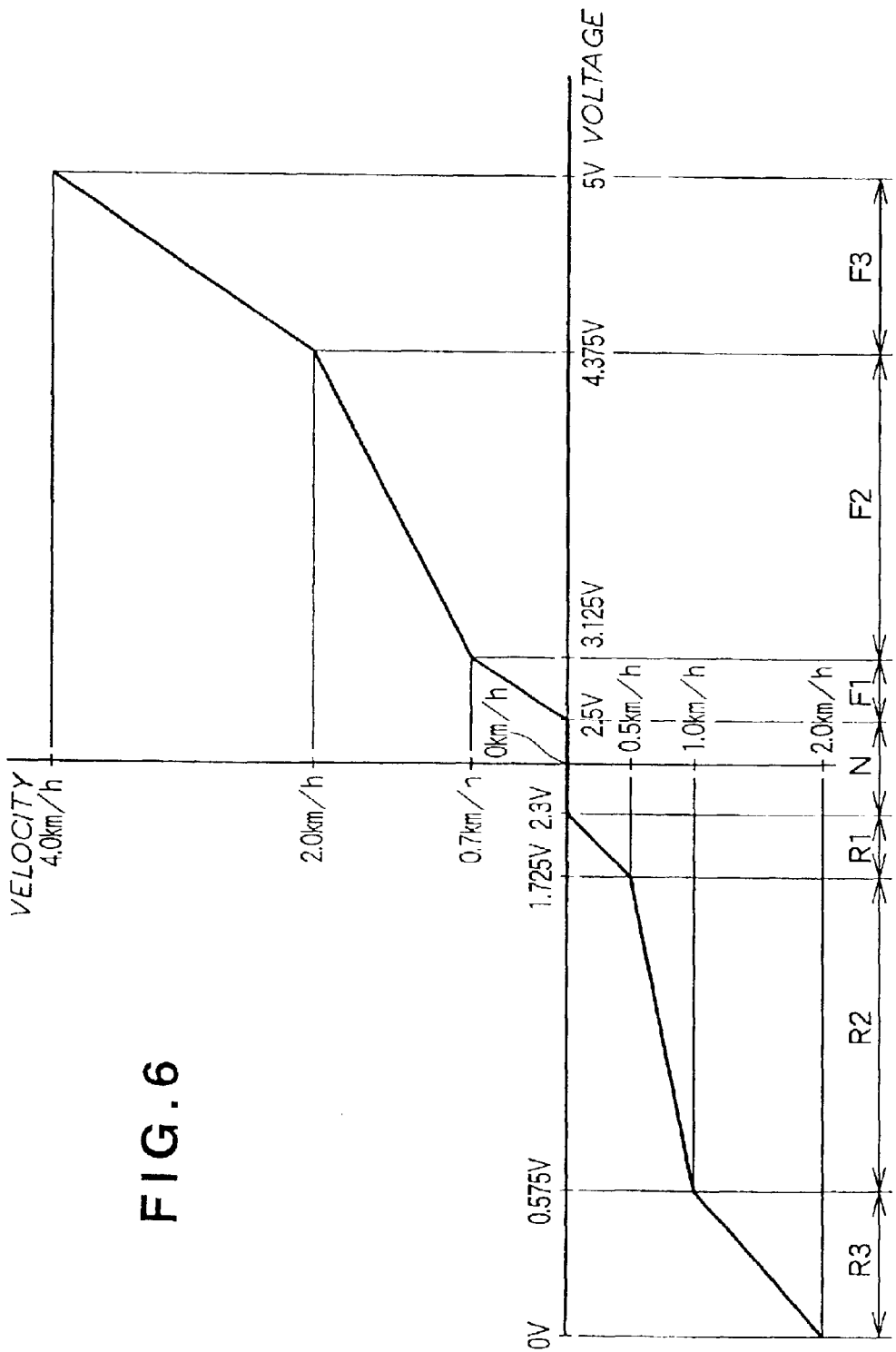
FIG. 6 is a graphical representation of velocities of the electric working machine at various voltages applied to a potentiometer, where a vertical axis shows the velocity and a horizontal axis shows the voltage.

Turning to FIG. 6, a horizontal axis shows a voltage applied to the potentiometer 57 while a vertical axis shows a velocity of the snow removing machine 10.

With reference to FIG. 6, the respective ranges F3, F2, F1, R3, R2, R1 provide different "velocity change rates" $F3v$, $F2v$, $F1v$, $R3v$, $R2v$, $R1v$, respectively. As used herein, the term "velocity change rate" refers to a value obtained by dividing a change in velocity by a change in voltage.

The velocity change rate $F3v$ of the range F3 is calculated as follows:

$$F3v=4.0-2.0/5-4.375=3.20$$

The velocity change rate $F2v$ of the range F2 is calculated as follows:

$$F2v=2.0-0.7/4.375-3.125=1.04$$

The velocity change rate $F1v$ of the range F1 is calculated as follows:

$$F1v=0.7/3.125-2.5=1.12$$

A relation between the velocity change rates $F3v$, $F2v$, $F1v$ is thus expressed by: $F3v>F1v>F2v$.

The velocity change rate $R1v$ of the range R1 is calculated as follows:

$$R1v=0.5/2.3-1.725=0.87$$

The velocity change rate $R2v$ of the range R2 is calculated as follows:

$$R2v=1-0.5/1.725-0.575=0.43$$

The velocity change rate $R3v$ of the range R3 is calculated as follows:

$$R3v=2.0-1.0/0.575=1.74$$

A relation between the velocity change rates $R3v$, $R2v$, $R1v$ is expressed by: $R3v>R1v>R2v$.

In FIG. 6, when the lever 56 moves in the range R3, a voltage developed at the potentiometer 57 varies within a range of 0 to 0.575 (V). When the lever 56 moves in the range R2, a voltage appearing at the potentiometer 57 varies within a range of 0.575 to 1.725 (V). When the lever 56 moves in the range R1, a voltage applied to the potentiometer 57 varies throughout a range of 1.725 to 2.3 (V). When the lever 56 moves in the neutral range N, a voltage developed at the potentiometer 57 varies over a range of 2.3 to 2.5 (V). When the lever 56 moves in the range F1, a voltage appearing across the potentiometer 57 varies within a range of 2.5 to 3.125 (V). When the lever 56 moves within the range F2, a voltage applied to the potentiometer 57 varies throughout a range of 3.125 to 4.375 (V). When the lever 56 moves within the range F3, a voltage developed across the potentiometer 57 varies over a range of 4.375 to 5 (V). It will be appreciated that the ranges F2, R2 provide the velocity change rates smaller than those of the ranges F1, R1, F3, R3. In other words, the velocity varies more gently or gradually when the lever 56 moves within the ranges F2, R2 than when the lever 56 moves within the ranges F1, R1, F3, R3.

The velocities within the range F2, R2 are more frequently selected by the human operator than those within the other ranges. The velocity varies in small increments or decrements when the lever 56 moves within the ranges F2, R2. With this arrangement, the snow removing machine 10 can perform its improved snow removing operation.

Figure 7:
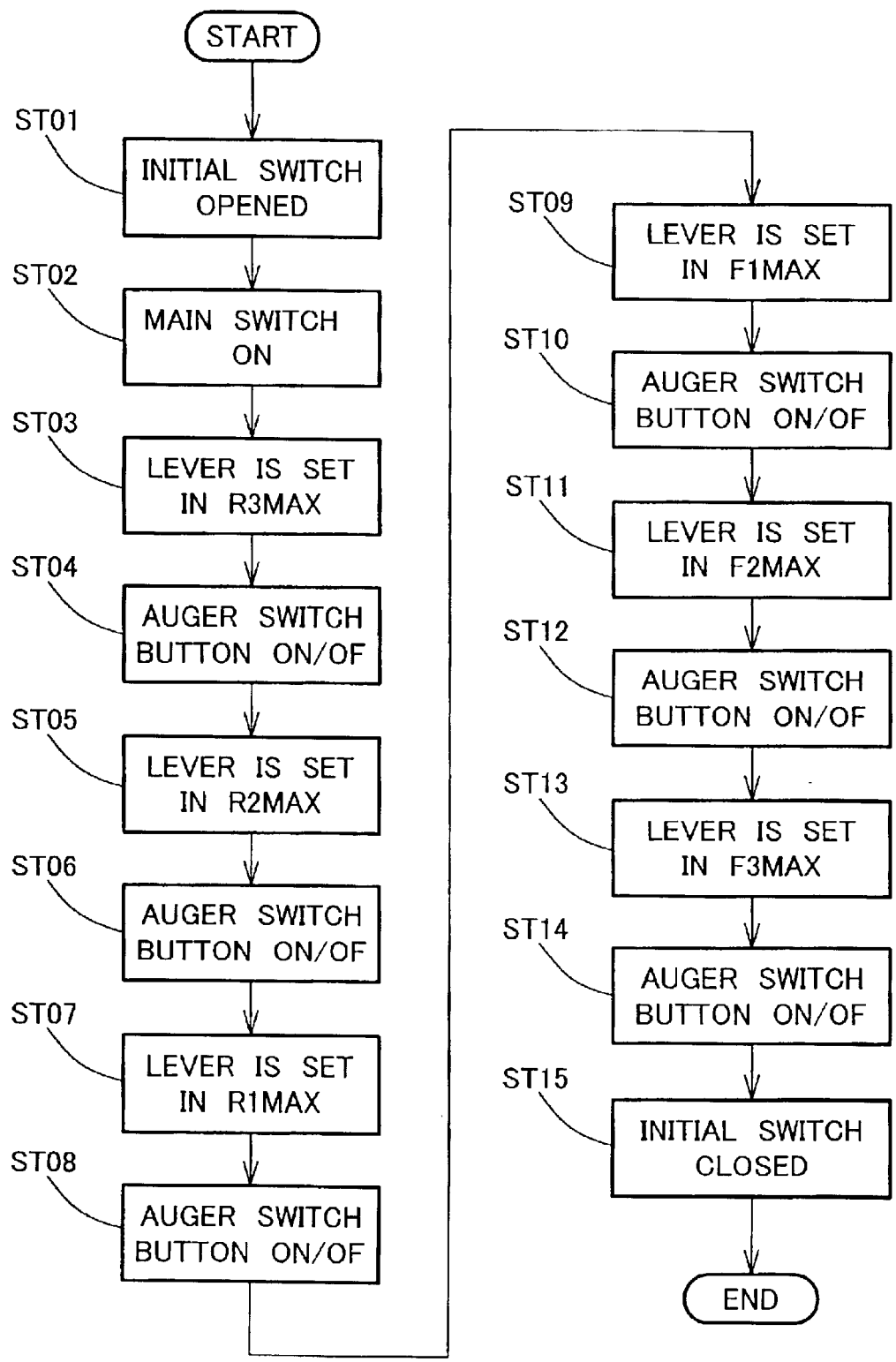
FIG. 7 is a view showing a sequence of operation for reading in a control unit values of voltages developed across the potentiometer when a speed adjustment lever is set in various positions.

The control unit 28 has read therein values of voltages developed across the potentiometer 57 when the lever 56 is in the respective positions R1MAX, R2MAX, R3MAX, N2, Nc, N1, F3MAX, F2MAX, F1MAX. These voltage values to be read in the control unit 28 contain errors caused due to, for example, installation of the potentiometer 57 and resistance values of the potentiometer 57. The sequence of operation for reading the voltage values into the control unit 28 is shown in FIG. 7.

ST01: The initialization is performed. That is, the initial switch 62 is in an open state where the connector 64 is detached from the coupler 65.

ST02: the main switch 45B is turned on.

ST03: the speed adjustment lever 56 is set in the high speed traveling maximum position R3MAX.

ST04: the auger switch button 45A is brought to the ON position and then back to the OFF position to thereby read into the control unit 28 a value of voltage VR3 developed when the lever 56 is in the high speed traveling maximum position R3MAX.

ST05: the speed adjustment lever 56 is set in the working middle speed maximum position R2MAX.

ST06: the auger switch button 45A is brought to the ON position and then back to the OFF position to thereby read into the control unit 28 a value of voltage VR2 developed when the lever 56 is in the working middle speed maximum position R2MAX.

ST07: the speed adjustment lever 56 is set in the working low speed maximum position R1MAX.

ST08: the auger switch button 45A is brought to the ON position and then back to the OFF position to thereby read into the control unit 28 a value of voltage VR1 developed when the lever 56 is in the working low speed maximum position R1MAX.

ST09: the speed adjustment lever 56 is set in the working low speed maximum position F1MAX.

ST10: the auger switch button 45A is brought to the ON position and then back to the OFF position to thereby read into the control unit 28 a value of voltage VF1 developed when the speed adjustment lever 56 is in the working low speed maximum position F1MAX.

ST11: the speed adjustment lever 56 is set in the working middle speed maximum position F2MAX.

ST12: the auger switch button 45A is brought to the ON position and then back to the OFF position to thereby read into the control unit 28 a value of voltage VF2 developed when the speed adjustment lever 56 is in the working middle speed maximum position F2MAX.

ST13: the speed adjustment lever 56 is set in the high speed traveling maximum position F3MAX.

ST14: the auger switch button 45A is brought to the ON position and then back to the OFF position to thereby read into the control unit 28 a value of voltage VF3 developed when the speed adjustment lever 56 is in the high speed traveling maximum position F3MAX.

It will be understood that the operations of ST01 to ST14 are performed in sequence to finish reading the voltage values VR3, VR2, VR1, VF1, VF2, VF3 into the control unit 28.

On the basis of these voltage values, the control unit 28 then performs an operation as follows.

First, the control unit 28 performs a calculation indicated by: NcV=(VF1-VR1)/2, where NcV is a voltage developed when the lever 56 is in the neutral position Nc. Then, the control unit does a calculation of: VN2=NcV−0.1, where VN2 is a value of voltage produced when the lever 56 is in the lower limit neutral position N2. Likewise, the control unit 28 performs a calculation: VN1=NcV+0.1, where VN1 is a value of voltage generated when the lever 56 is in the upper limit neutral position N1. These values NcV, VN1, VN2 thus obtained are read into the control unit 28, too.

The control unit 28 performs further calculations: (VR3-VR2), (VR2-VR1), (VR1-VN1), (VF1-VN2), (VF2-VF1), and (VF3-VF2) to provide the voltage variable linearly with the velocity of the machine 10 when the lever 56 moves within the respective ranges R1, R2, R3, F1, F2, F3, as shown in FIG. 6.

ST15: the initial switch 62 is brought to a closed state where the connector 64 is attached to the coupler 65.

It should be noted that the values of the voltage and velocity corresponding to the respective positions R3MAX, R2MAX, R1MAX, F3MAX, F2MAX, F1MAX are not limited to those as shown in FIG. 5. The voltage and velocity may be set to be other values such that the velocity varies more gently or gradually when the lever 56 moves within the working middle speed range than when the lever 56 moves within the other ranges.

Figure 8:
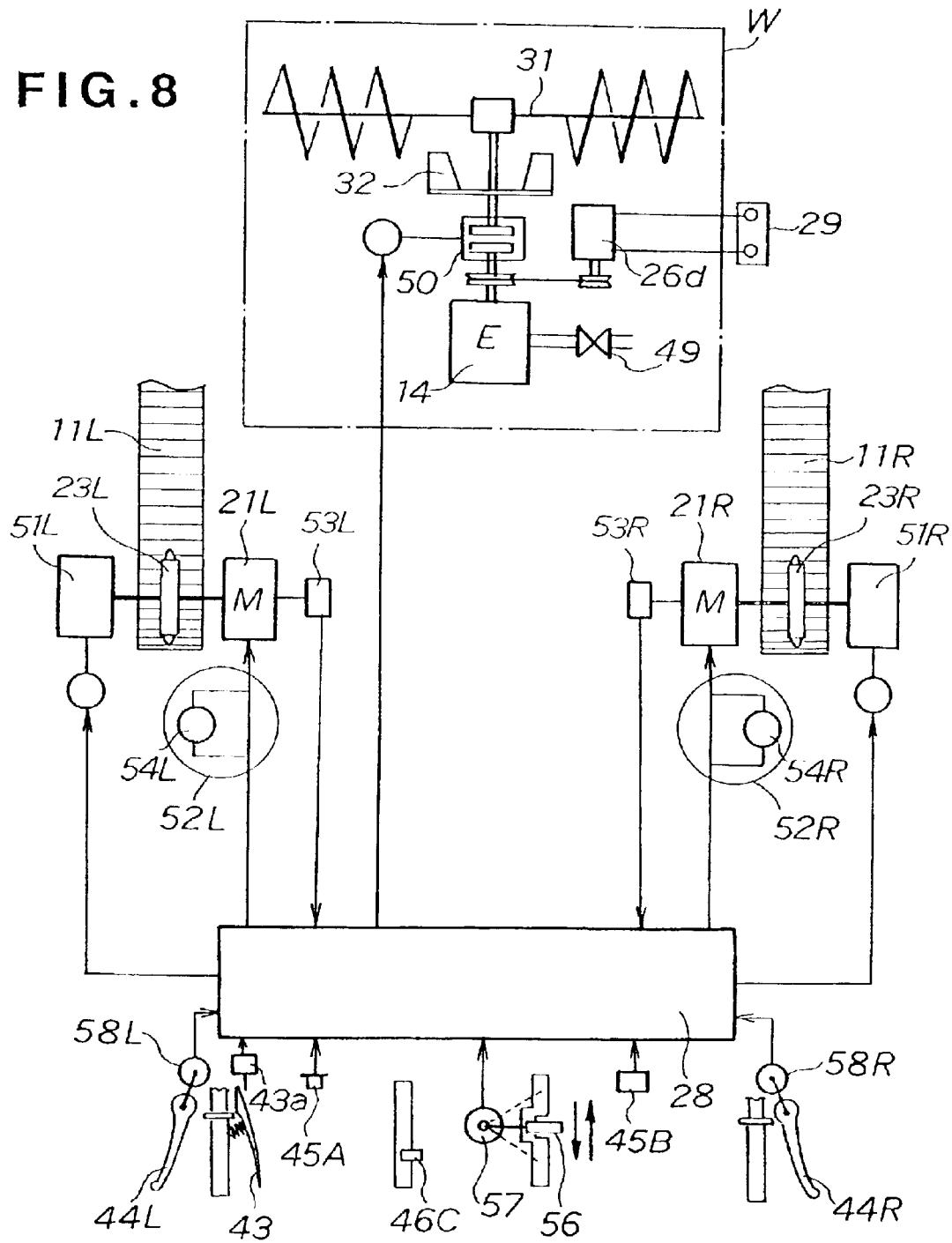
FIG. 8 is a view diagrammatically showing how the electric working machine is controlled.

Referring to FIG. 8, there is shown a working system designated generally at W. The working system W includes the engine 14, the electromagnetic clutch 50, the blower 32, and the auger 31.

Description will be made as to how the working system W is operated in relation to FIG. 8.

The key (not shown) is inserted into the slit formed in the main switch 45B and then turned to a starting position where a self starter motor (not shown) is actuated to start the engine 12.

The throttle lever 46C is connected through a throttle wire (not shown) to a throttle valve 49. Manipulating the throttle lever 46C controls an amount by which the throttle valve 49 is opened. This makes it possible to control the engine speed of the engine 12.

Grasping the lever 43 together with the grip 18L, the human operator operates the auger switch button 45A to thereby bring the electromagnetic clutch 50 to the engaged state in which the auger 31 and the blower 32 are driven to rotate.

When the human operator takes her or his hand off the lever 43 or operates the button 45A, the clutch 50 can be brought to the disengaged state in which the auger 31 and the blower 32 stop rotating.

The snow removing machine 10 includes right and left magnetic brakes 51R, 51L similar to parking brakes for an automobile. The control unit 28 controls the brakes 51R, 51L. As the snow removing machine is parked, the brakes 51R, 51L are in applied positions. The brakes 51R, 51L can be brought to released positions in the following manner.

With the key held in the starting position and with the lever 43 and the grip 18L grasped together by the operator's hand, the speed adjustment lever 56 is moved into the forward range Fw or the reverse range Rw to thereby bring the brakes 51R, 51L to the released positions.

The potentiometer 57 transmits to the control unit 28 information on a range where the lever 56 is positioned. On receiving the information from the potentiometer 57, the control unit 28 causes right and left motor drivers 52R, 52L to rotate the motors 21R, 21L. Right and left sensors 53R, 53L then detect speeds of rotations of the motors 21R, 21L and send to the control unit 28 signals indicative of the rotational speeds of the motors 21R, 21L. On the basis of these signals sent from the sensors 53R, 53L, the control unit 28 brings the rotational speeds to predetermined values. This causes each of the drive wheels 23R, 23L to rotate at a desired speed in a desired direction.

The motor drivers 52R, 52L include regenerative braking circuits 54R, 54L.

As is well known in the art, electric motors are caused to rotate when supplied with electric energy from battery. Generators rotate to provide electric energy. According to the present invention, as stated hereinbefore, the electric motors 21R, 21L are subjected to regenerative braking. That is, the electric motors 21R, 21L are switched to generators to thereby produce electric energy. When voltages produced by the electric motors 21R, 21L are greater than those of the batteries 29, 29, the electric energy of the motors 21R, 21L is stored in the batteries 29, 29.

More specifically, the potentiometer 58L detects an extent to which the left turn lever 44L is grasped together with the grip 18L. The potentiometer 58L then sends to the control unit 28 a signal indicative of the extent. Upon receipt of such a signal, the control unit 28 drives the left regenerative braking circuit 54L to decrease the rotational speed of the motor 21L.

The right turn lever 44R includes a potentiometer 58R as does the left turn lever 44L. The potentiometer 58R detects an extent to which the lever 44R is grasped along with the grip 18R. The potentiometer 58R transmits to the control unit 28 a signal indicative of the extent. On receiving the signal, the control unit 28 drives the regenerative braking circuit 54R to decrease the rotational speed of the motor 21R.

With this arrangement, it becomes possible to turn the snow removing machine 10 rightward by grasping the lever 44R. Likewise, grasping the lever 44L turns the machine 10 leftward.

The snow removing machine 10 stops traveling when the human operator performs any one of the following three operations:

(1) Return the speed adjustment lever 56 into the neutral range N.
(2) Release her or his hand from the lever 38.
(3) Switch the main switch 45B to "OFF position" as will be explained later.

When the main switch 28 is switched off after the snow removing machine 10 stops traveling, the electromagnetic brakes 51R, 51L are brought to the applied positions to thereby apply a parking brake.

Figure 9:
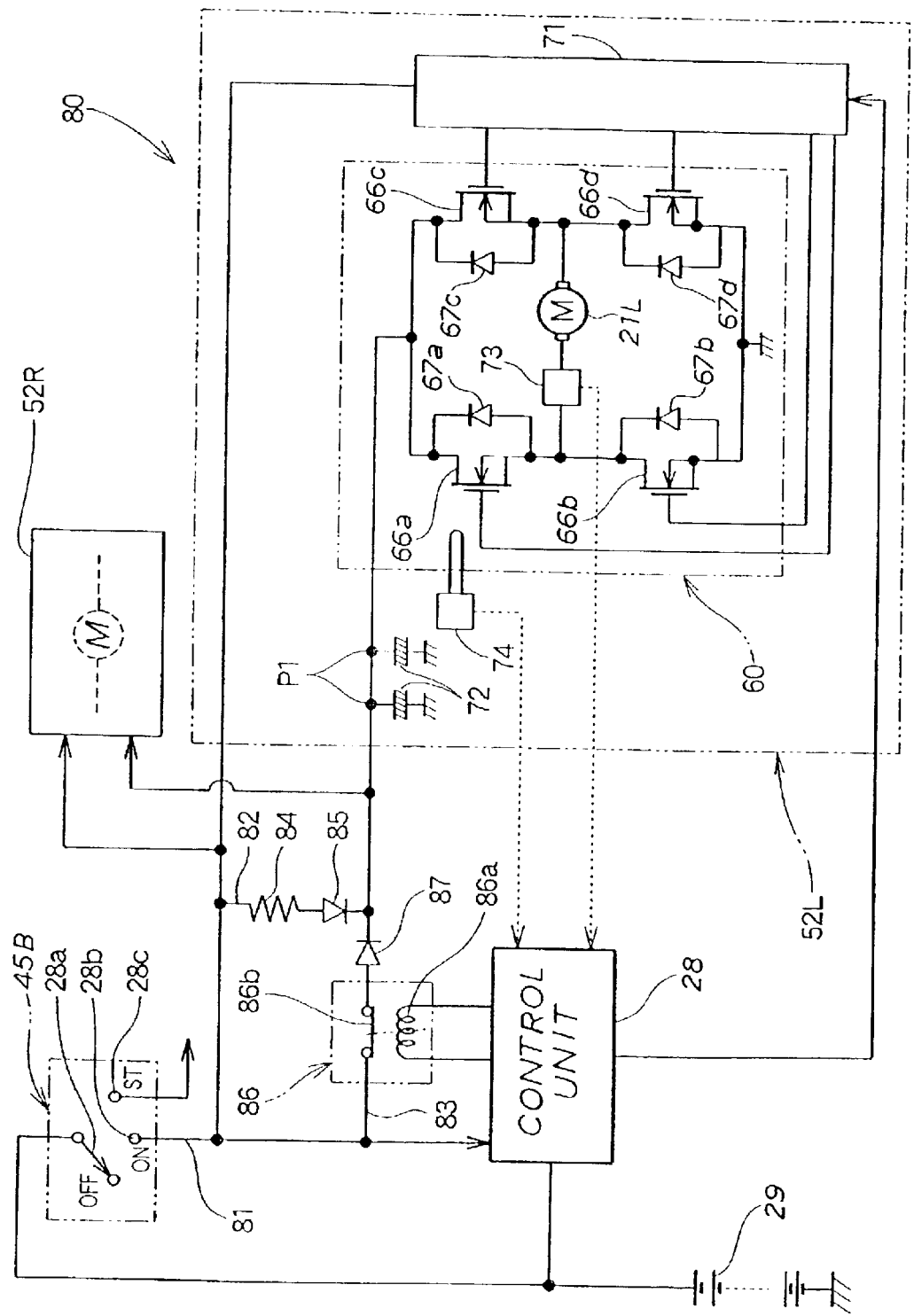
FIG. 9 is a circuit diagram including the control unit and electric motors of the working machine.

Reference is made to FIG. 9 showing a circuit of the snow removing machine 10 including the motors 21R, 21L, the main switch 28, the battery 29, the control unit 28, and the motor drivers 52R, 52L. For simplicity, only one battery is shown. When the key inserted into the slit is turned, the main switch 45B is brought to one of "OFF position", "ON position", and "START position". The main switch 45B includes a movable arm member 28a and two stationary contacts 28b, 28c. When the main switch 45B is in the ON position, the movable arm member 28a contacts the contact 28b. When the mains witch 45B is in the START position, the movable arm member 28a contacts the contact 28c.

When the main switch 45B is switched from the OFF position to the START position, the engine 12 is started.

The snow removing machine 10 includes a power source device 80. The machine 10 is designed such that the control unit 28 controls the electric motors 21R, 21L through the motor drivers 52R, 52L.

The left motor driver 52L includes a motor driving circuit 60 for driving the left electric motor 21L, a gate driving circuit 71 for controlling the motor driving circuit 60, two capacitors 72, 72 for stabilizing a voltage applied to the motor 21L, and a temperature detector 74 for detecting a temperature of the circuit 60. The motor driving circuit 60 includes a current detector 73 for detecting a current flowing through the motor 21L.

The motor driving circuit 60 includes four field-effect transistors (hereinafter referred to as "FET") 66a, 66b, 66c, 66d, and four diodes 67a, 67b, 67c, 67d each connected to a drain and a source of each FET. The gate driving circuit 71 controls gates of the respective FETs.

The electric motor 21L is connected to both a junction between the first FET 66a and the second FET 66b and a junction between the third FET 66c and the fourth FET 66d. The first FET 66a and the third FET 66c are connected to the contact 28b. The second FET 66b and the fourth FET 66d are connected to ground.

The gate driving circuit 71 is connected to the battery 29 via the contact 28b for supply of electricity thereto. Further, the circuit 71, when receiving a control signal output from the control unit 28, turns the four FETs 66a, 66b, 66c, 66d on or off.

It should be noted that the right motor driver 52R is substantially identical in arrangement to the aforementioned left motor driver 52L. The description of the right motor driver 52R will be omitted.

The power source device 80 includes a feeding circuit 81 for supplying the motors 21R, 21L with power provided by the battery 29 through the main switch 45B and the motor drivers 52R, 52L. The circuit 81 has the capacitors 72, 72 connected thereto. The circuit 81 includes a preliminary charge circuit 82 and a charge circuit 83 provided between the contact 28b of the main switch 45B and the capacitors 72, 72. The circuits 82, 83 are connected in parallel with each other. The circuit 81 includes two points P1 between the contact 28b and the motor driving circuit 60. Each point P1 is connected to one end of each capacitor 72. The other end of each capacitor 72 is connected to ground.

The preliminary charge circuit 82 and the charge circuit 83 which are parallel to each other are connected between the contact 28b and the points P1. The preliminary charge circuit 82 includes only a resistor 84 and a diode 85. The circuit 82 has no switches. The charge circuit 83 includes only a relay 86 and a diode 87. The relay 86 includes a normally closed contact 86b.

The relay 86 further includes a coil 86a controlled by the control unit 28. When the control unit 28 carries an exciting current to the coil 86a, the contact 86b is opened.

When receiving from the main switch 45B an ON operation signal indicating that the main switch is brought to the ON position where the movable arm member 28a comes into contact with the contact 28b, the control unit 28 controls the relay 86 and the gate driving circuit 71 of the right and left motor drivers 52R, 52L. The control unit 28 controls the relay 86 for a period (hereinafter referred to as "preliminary charging period") from a time at which the main switch 45B is brought to the ON position to a time at which the capacitors 72, 72 are charged to provide a fixed voltage. During the preliminary charging period, the control unit 28 keeps the contact 86b open.

Description will be made as to how the power source device 80 is operated with reference to FIG. 9. When the movable arm member 28b comes into contact with the contact 28b to bring the main switch 45B to the ON position, the gate driving circuit 71 of the right and left motor drivers 52R, 52L are supplied with electricity.

Upon receiving the ON operation signal from the main switch 45B, the control unit 28 carries the exciting current to the coil 86a for the preliminary charging period. As the exciting current flows through the coil 86a, the contact 86b is open to thereby bring the charge circuit 83 to an open state. During the preliminary charging period, the battery 29 carries a current to the preliminary charge circuit 82 through the main switch 45B to gradually charge the capacitors 72, 72. The circuit 82 provides a time constant depending upon a resistance of the resistor 84 and capacitances of the capacitors 72, 72.

The control unit 28 has a timer (not shown) built therein. The timer is designed to measure the preliminary charging period. The preliminary charging time is 1 (sec), for example.

When the preliminary charging period elapses, the control unit 28 stops the carrying of exciting current to the coil 86a to thereby close the contact 86b. The charge circuit 83 thus becomes a closed circuit. With the contact 86b closed, the battery 29 carries a current to the charge circuit 83 through the main switch 45B to quickly charge the capacitors 72, 72. The reason the capacitors 72, 72 are quickly charged is that the charge circuit 83 does not have any resistor. It should be noted that the capacitors 72, 72 maybe charged through the preliminary charge circuit 82 rather than through the charge circuit 83.

The control unit 28 outputs a pulse-width modulation (PWM) signal to the gate driving circuit 71 whereby the battery 29 supplies a current to the motors 21R, 21L through the capacitors 72, 72 and the motor drivers 52R, 52L so as to rotate the motors 21R, 21L.

The capacitors 72, 72 serve to cut off noise caused by the motors 21R, 21L and the like or prevent an undesirable temporary change in voltage of the batteries 29 to thereby stabilize voltages provided to the motor 21R, 21L.

For the preliminary charging period, a current for charging the capacitors 72, 72 is extremely large.

The preliminary charge circuit 82 does not any switch which would be unavoidably required to have durability large enough to withstand a large current used for charging the capacitors 72, 72. The control unit 28 controls the contact 86b to thereby keep the same open until the preliminary charging period elapses. No current for charging the capacitors 72, 72 thus flows through the circuit 83, i.e., the contact 86b. The contact 86b need not be designed providing for the flow of the extreme large current through the capacitors 72, 72.

The control unit 28 includes: (1) A stop section for issuing to the motor drivers 52R, 52L a current carrying stop command for stopping carrying currents to the motors 21R, 21L when a current Ir1 or Ir2 flowing through the motor 21R or 21L exceeds an upper threshold level or value Is (see FIG. 10). (2) A restart section for issuing to the motor drivers 52R, 52L a current carrying start command for starting carrying the currents to the motors 21R, 21L to prevent the current Ir1 or Ir2 flowing through the motor 21R or 21L from decreasing to 0 (A) after the issuance of the current carrying stop command. (3) A repetition section for alternately repeating the issuance of the current carrying stop command and the issuance of the current carrying start command. (4) A first complete stop section for issuing to the motor drivers 52R, 52L a first stop command for completely stopping operations of the motors 21R, 21L when the number of times the issuance of the current carrying stop command and the issuance of the current carrying start command are alternately repeated reaches the predetermined number of times Rs. (5) A second complete stop section for issuing to the motor drivers 52R, 52L a second stop command for completely stopping the operations of the motors 21R, 21L when temperatures Tem 1a and/or Tem 1b of the motor driving circuit(s) of the motor drivers 52R, 52L exceed an upper limit threshold level or value Tem 2.

More specifically, the control unit 28 serves the following five functions: (1) Issuance of the current carrying stop command to the motor drivers 52R, 52L when the currents Ir1 and/or Ir2 flowing through the right and/or left motors 21R, 21L exceed the upper threshold level Is. (2) Issuance of the current carrying start command to the motor drivers 52R, 52L after the issuance of the current carrying stop command to prevent the current(s) flowing through the right and/or left motors 21R, 21L from falling to zero. (3) Alternate repetition of the issuance of the current carrying stop command and the issuance of the current carrying start command. (4) Issuance of the first stop command to the motor drivers 52R, 52L when the number of times the issuance of the current carrying stop command and the issuance of the current carrying start command are alternately repeated reaches the predetermined number of times Rs. (5) Issuance of the second stop command to the motor drivers 52R, 52L when the temperatures Tem 1a and/or Tem 1b of the motor driving circuit(s) of the right and/or left motor drivers 52R, 52L exceed the upper limit threshold level Tem 2.

Figure 10:
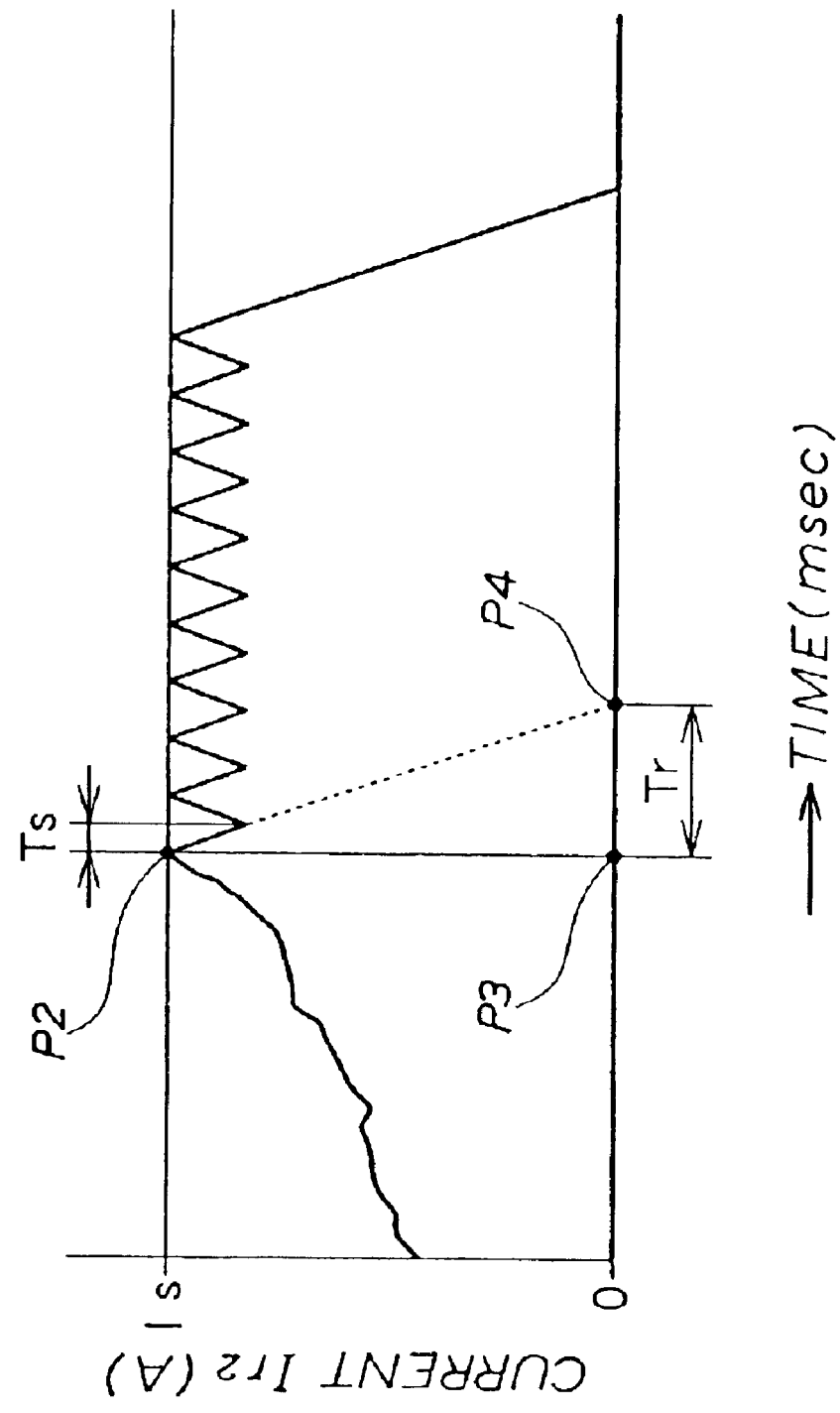
FIG. 10 graphically showing how an abnormally high current flowing through the motor is controlled by the control unit.

Reference is made to FIG. 10. A horizontal axis shows a time (millisecond) while a vertical axis shows a current (A) flowing through either of the motors 21R, 21L.

The current flowing through the motor when the motor is placed under an overload may rise to the upper limit threshold level Is beyond which the motor can not withstand. The threshold level Is may be set to be a maximum one of values of the currents which the motor can withstand.

When the overload is imposed on, for example, the motor 21L to thereby increase the current Ir2 to the threshold level Is (as shown by a point P2), the control unit 28 issues the current carrying stop command to the motor drivers 52R, 52L to thereby stop carrying currents to the motors 21R, 21L. This causes the current Ir2 to begin dropping towards 0 (A). After the current carrying stop command is issued from the control unit 28, the current Ir2 would fall to 0 (A) in a period of time Tr, as shown by a dotted line of FIG. 10. The period Tr is a length of time between a point P3 and a point P4.

Generally, after carrying of current to an electric motor is stopped, under the influence of inductance of a coil of the motor, it takes a little time (about 1 millisecond) for the current flowing through the motor to drop to 0 (A). The present invention advantageously utilizes such an electric motor. That is, such a current flowing through the motor drops to 0 (A) in the period of time Tr. The period of time Tr is hereinafter referred to as "current drop period Tr".

As show in FIG. 10, the control unit 28 issues the current carrying start command in a period of time Ts shorter than the current drop period Tr, such that the carrying of currents to the motors 21R, 21L is restarted. Thereafter, the current Ir2 rises again. As the motor remains placed under the overload, the current undesirably reaches the threshold level Is. At this time, the control unit 28 issues the current carrying stop command again to thereby stop the carrying of currents to the motors 21R, 21L.

As long as the motor is in the overload state, the control unit 28 operates to alternately repeat the issuance of the current carrying stop command and the issuance of the current carrying start command.

As is apparent from the foregoing description, after issuing the current carrying stop command with the motor 21L in the overload state, the control section 28 issues the current carrying start command in the short period Ts to thereby start the carrying of currents to the motors. With this arrangement, the stopping and restarting of the carrying of the current can alternate at short intervals. Since the control unit 28 starts the carrying of currents to the motors 21R, 21L while the current Ir2 is decreasing from the threshold level Is, the current Ir2 is varied by a limited amount after the motor is brought to the overload state. Consequently, torque produced by the motor is varied to a limited extent. It thus becomes possible to operate the motors 21R, 21L, bringing the motor 21L out of the overload state. This enables the snow removing machine 10 to keep traveling.

With this arrangement, excessive current does not flow through the motors 21R, 21L and their associated components to protect the motors and the components.

Figure 11:
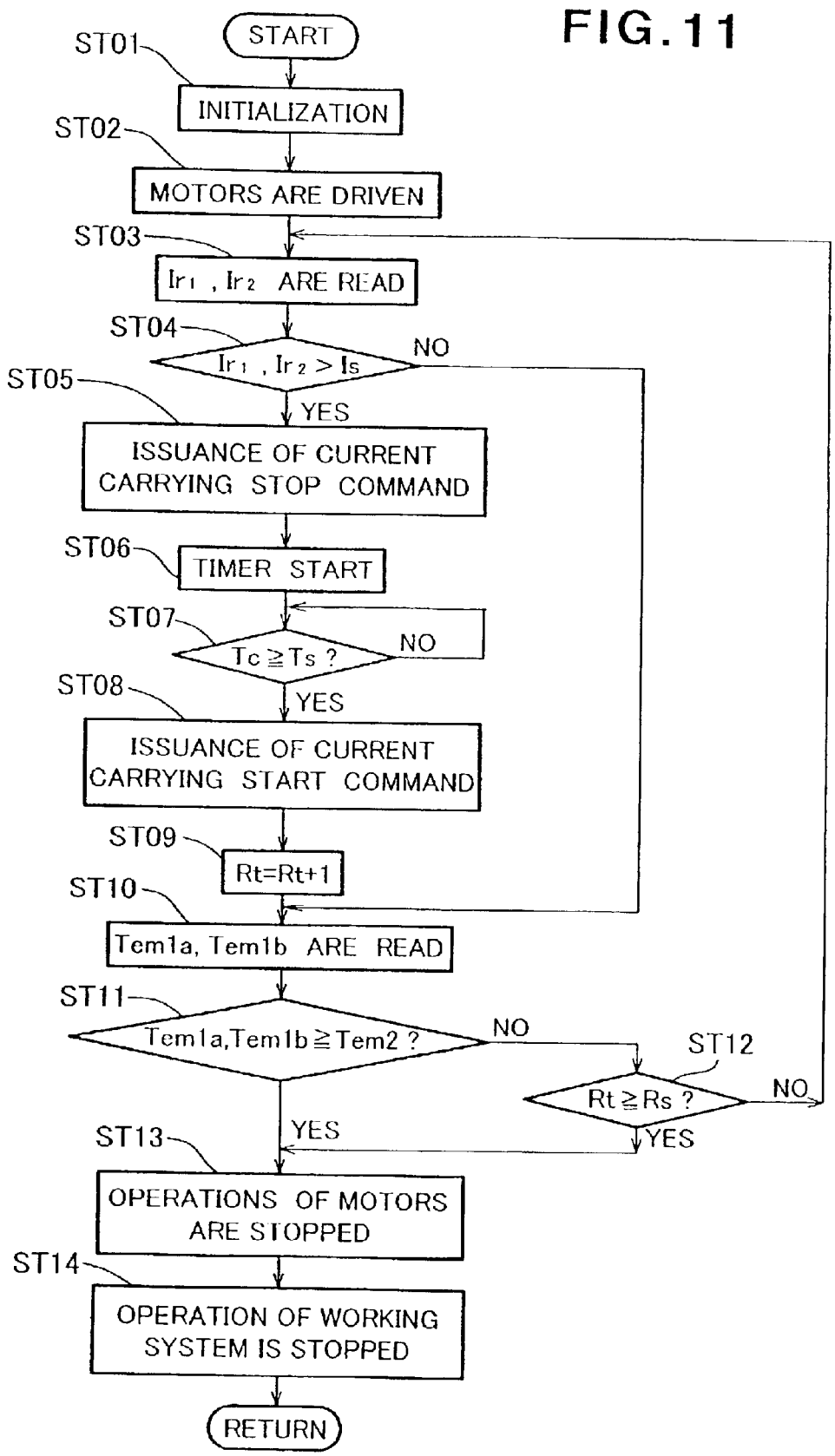
FIG. 11 is a flow chart showing how the control unit is operated especially when the current(s) flowing through the motor(s) and temperature(s) of motor driving circuits for driving the motors are abnormally high.

FIG. 11 shows how the control unit 28 is operated to control the motors 21R, 21L by means of the motor drivers 52R, 52L. The control unit 28 is a microcomputer, for example.

The control unit 28 starts to operate when the main switch 45B is switched to the ON position.

ST01: Initialization is performed. For example, the number of times Rt each of the issuance of the current carrying stop command and the issuance of the current carrying start command is repeated is set to zero (Rt=0).

ST02: The control unit 28 sends the PWM signal to the motor drivers 52R, 52L to rotate the motors 21R, 21L.

ST03: The control unit 28 reads a value of each of the currents Ir1, Ir2 flowing through the respective motors 21R, 21L by means of the current detectors 73, 73.

ST04: The control unit 28 checks to see if each of the currents Ir1, Ir2 exceeds the upper limit threshold level Is. If the current Ir2 flowing through, for example, the motor 21L is greater than the threshold level Is, the control unit 28 considers or judges the current Ir2 to be abnormally high. The operation of the control unit 28 is thus transferred to ST05. If the current Ir2 is equal to or less than the threshold level Is, the operation of the control unit 28 is transferred to ST10.

ST05: The control unit 28 issues the current carrying stop command to the motor drivers 52R, 52L such that the motor 21L avoids being in the overload state. That is, "duty factor" of the PWM signal is made zero. By the term "duty factor", it is meant the ratio of the pulse width to the period of one pulse of pulse train. The "duty factor" is often referred to as "pulse duty factor".

ST06: The timer built in the control unit 28 is reset to start measuring a period of time Tc elapsed after the issuance of the current carrying stop command.

ST07: The control unit 28 checks to see if the period Tc becomes equal to or longer than the period Ts (see FIG. 10) shorter than the current drop period Tr required for the current Ir2 to fall to 0 (A) after the issuance of the current carrying stop command. If the period Tc becomes equal to or longer than the period Ts, the operation of the control unit 28 proceeds to ST08. If the period Tc is shorter than the period Ts, the control unit 28 repeats the operation of ST07.

ST08: The control unit 28 issues the current carrying start command to the motor drivers 52R, 52L. More specifically, the control unit 28 issues the PWM signal having a duty factor set immediately before the current carrying stop command is issued in ST05.

ST09: Since the control unit 28 issues each of the current carrying stop command and the current carrying start command once, the number of times Rt increases by one.

ST10: The control unit 28 reads a value of each of the temperatures Tem 1a, Tem 1b of the respective motor driving circuits 60, 60 of the motor driver 52R, 52L through the temperature detectors 74, 74.

ST11: The control unit 28 checks to see if each of the temperatures Tem 1a, Tem 1b reaches the upper limit threshold level Tem 2 previously set. If the temperature Tem 1b of the circuit 60 of, for example, the motor driver 52L is equal to or greater than the threshold level Tem 2, the control unit 28 considers or judges the temperature Tem 1b to be abnormally high. The operation of the control unit 28 is thus transferred to ST13. If the temperature Tem 1b does not yet reach the threshold level Tem 2, the operation of the control unit 28 is transferred to ST12.

ST12: The control unit 28 checks to see if the number of times Rt reaches the predetermined number of times Rs. If the number of times Rt reaches the predetermined number of times Rs, the control unit 28 considers a time of period during which the motor is in the overload state to be long. The operation of the control unit 28 is transferred to ST13. If the number of times Rt does not reach the predetermined number of times Rs, the operation of the control unit 28 is returned to ST03.

ST13: The control unit 28 judges the motor to be still in the overload state or otherwise the temperature Tem 1b of the motor driving circuit to be abnormally high. Therefore, the control unit 28 issues a first or second stop command to the motor drivers 52R, 52L so as to completely stop the operations of the motors 21R, 21L.

ST14: The control unit 28 brings the working system W out of operation. The operation of the control unit 28 is returned to START.

As stated above, the control unit 28 includes the stop section, the restart section, the repetition section, and the first and second complete stop sections. The stop section of the control unit 28 is designed to issue the current carrying stop command to the motor drivers when the current(s) flowing through the motor(s) exceed the threshold level Is, as described with reference with ST03 to ST05.

The restart section of the control unit 28 is designed to issue the current carrying start command to the motor drivers by the time the period of time Tr required for the current Ir to fall to zero elapses, as described with reference to ST06 to ST08.

The repetition section of the control unit 28 is designed to repeat the issuance of each of the current carrying stop command and the current carrying start command, as described with respect to ST09 and ST12.

As described in relation to ST11 to ST13, the first and second complete stop sections of the control unit 28 are designed to issue the first and second stop commands to the motor drivers when: (1) Either one or both of the temperatures of the motor driving circuits exceed the upper threshold level. (2) The number of times Rt the issuance of each of the current carrying stop command and the current carrying start command is repeated reaches the predetermined number of times Rs.

Figure 12:
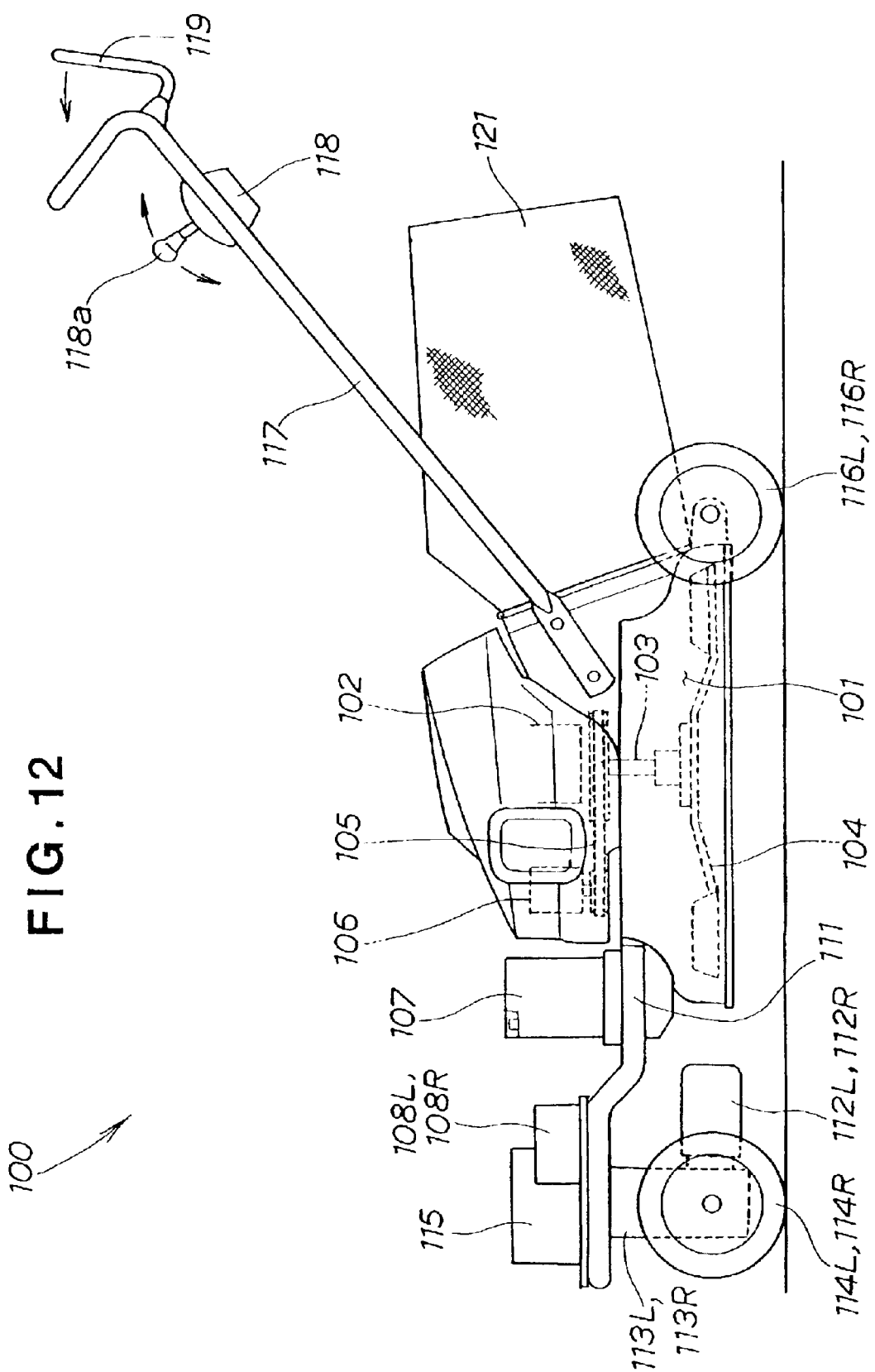
FIG. 12 is a side elevation view of an electric working machine according to a second embodiment of the present invention.

It will be appreciated that the present invention is applicable to a walk-behind lawn mower 100 as shown in FIG. 12 as well as the snow removing machine 10.

Referring to FIG. 12, the lawn mower 100 includes a housing 101 and an engine 102 carried on the housing 101. The lawn mower 100 includes a rotational shaft 103 to be driven by the engine 102. The rotational shaft 103 has a cutter 104 attached thereto. Part of an output from the engine 102 is used to drive a generator 106. The generator 106 produces a power to be supplied to a battery 107 and right and left electric motors 112R, 112L.

The housing 101 has a body 111 positioned forwardly thereof. The body 111 has the electric motors 112R, 112L and right and left power transmission mechanisms 113R, 113L mounted thereon. The body 111 further has a control unit 115 attached thereto. The control unit 115 is designed to control the motors 112R, 112L by means of right and left motor drivers 108R, 108L. The power transmission mechanisms 113R, 113L are designed to transmit to right and left driving wheels 114R, 114L motive power produced by the motors 112R, 112L.

Right and left rear wheels 116R, 116L are mounted at lower portions of rear ends of the housing 101. The housing 101 has an operational bar 117 extending backwardly from a rear upper part thereof. The bar 117 includes a device 118 and a cutter lever 119. The device 118 includes a potentiometer for providing information on a position where a speed adjustment lever 118a is held. Operation of the lever 118a of the device 118, as shown by arrows, adjusts a speed of the lawn mower 100 in addition to advancing or retreating the lawn mower 100. When the cutter lever 119 is caused to pivot as shown by an arrow, the cutter 104 is rotated.

The housing 101 has a grass bag 121 detachably mounted to a rear part thereof. Grass cut off by the cutter 104 is guided into the grass bag 121.

The lawn mower 100 offers the same advantages as the snow removing machine 10 because they are the same in construction. More particularly, the motor drivers 108R, 108L are identical in construction to the motor drivers 52R, 52L. The motors 112R, 112L are arranged in the same manner as the motors 21R, 21L. The control unit 115 is operated in the same manner as the control unit 28 as stated above. The lever 118a is arranged in the same manner as the lever 56. The potentiometer of the device 118 is the same in construction as the potentiometer 57.

The present disclosure relates to the subject matters of Japanese Patent Application Nos. 2001-337465 and 2001-362781, respectively filed Nov. 2 and Nov. 28, 2001, the disclosures of which are expressly incorporated herein by reference in their entireties.

What is claimed is:

1. An electric working machine comprising: a plurality of drive wheels; a plurality of electric motors for driving the drive wheels to cause the electric working machine to travel along the ground; a speed adjustment member mounted to undergo movement within a range of positions including a neutral range position, a low movement speed range position, an intermediate movement speed range position, and a high movement speed range position; a potentiometer for receiving a voltage which varies in response to movement of the speed adjustment member within the range of positions; and a control unit for controlling the electric motors in accordance with the voltage received by the potentiometer so that the electric working machine stops traveling when the speed adjustment member is in the neutral range position, the electric working machine travels at a low speed while performing a working operation when the speed adjustment member is in the low movement speed range position, the electric working machine travels at an intermediate speed while performing the working operation when the speed adjustment member is in the intermediate movement speed range position, and the electric working machine travels at a high speed without performing the working operation when the speed adjustment member is in the high speed movement range position; wherein a rate of change of the speed of the electric working machine is smaller when the speed adjustment member is in the intermediate movement speed range position than when the speed adjustment member is in each of the low movement speed range position and the high movement speed range position.

2. An electric working machine comprising: a plurality of drive wheels; a plurality of electric motors for driving the drive wheels to cause the electric working machine to travel alone the ground; a speed adjustment member mounted to undergo movement within a range of positions including a neutral range position, a low movement speed range position, an intermediate movement speed range position, and a high movement speed range position; a potentiometer for receiving a voltage which varies in response to movement of the speed adjustment member within the range of positions; and a control unit having a plurality of motor drivers for controlling the electric motors to drive the drive wheels in accordance with the voltage received by the potentiometer so that the electric working machine stops traveling when the speed adjustment member is in the neutral range position, the electric working machine travels at a low speed while performing a working operation when the speed adjustment member is in the low movement speed range position, the electric working machine travels at an intermediate speed while performing the working operation when the speed adjustment member is in the intermediate movement speed range position, and the electric working machine travels at a high speed without performing the working operation when the speed adjustment member is in the high speed movement range position; wherein the control unit has a stop section for issuing to the motor drivers a stop command for stopping a supply of current to each of the electric motors when a current flowing through each of the electric motors exceeds an upper limit threshold level, a restart section for issuing to the motor drivers a start command for starting the supply of current to each of the electric motors to prevent the current flowing through each of the electric motors from falling to zero after the stop section issues the stop command, and a repetition section for repeating the issuance of the stop command by the stop section and the start command by the restart section.

3. An electric working machine comprising:
a speed adjustment member mounted to undergo movement within a range of positions including a neutral range position, a low speed range position, an intermediate speed range position, and a high speed range position for adjusting a travel speed of the electric working machine;
a potentiometer for receiving a voltage which varies in dependence on the position of the speed adjustment member within the range of positions; and control means for controlling the travel speed of the electric working machine in accordance with the variation of the voltage received by the potentiometer so that a rate of change of the speed of the electric working machine is smaller when the speed adjustment member is in the intermediate speed range position than when the speed adjustment member is in each of the low speed range position and the high speed range position.

4. An electric working machine according to claim 3; wherein the control means comprises an electric motor and a control unit for controlling a rotational speed of the electric motor to determine the traveling speed of the electric working machine.

5. An electric working machine according to claim 4; wherein the control unit comprises first means for issuing a stop command to stop a supply of current to the motor when the current flowing through the electric motor exceeds a preselected value, and second means for issuing a start command to start the supply of current to the motor to prevent the current flowing through the electric motor from dropping to zero after the first means issues the stop command.

6. An electric working machine according to claim 5; wherein the control unit comprises third means for repeating the issuance of the stop command by the first means and the start command by the second means.

7. An electric working machine according to claim 3; further comprising at least one drive wheel mounted to undergo rotation to move the electric working machine; and wherein the control means comprises an electric motor for receiving an electric current to rotate the drive wheel, and a control unit for controlling the electric motor to rotate the drive wheel in accordance with the variation of the voltage received by the potentiometer.

8. In combination with an electric working machine having an electric motor, a control section mounted on the electric working machine for controlling a travel speed of the electric working machine, the control section comprising: a speed adjustment member for undergoing movement within a range of positions including a low speed range position in which the electric working machine travels at a low speed, a high speed range position in which the electric working machine travels at a high speed, and an intermediate speed range position in which the electric working machine travels at a speed intermediate of the low speed and the high speed; a potentiometer for receiving a voltage which varies in dependence on the position of the speed adjustment member within the range of positions; and a control unit for controlling the electric motor in accordance with the variation of the voltage received by the potentiometer to vary a travel speed of the electric working machine so that a rate of change of the travel speed of the electric working machine is smaller when the speed adjustment member is in the intermediate speed range position than when the speed adjustment member is in each of the low speed range position and the high speed range position.

9. A combination according to claim 8; wherein the control unit comprises first means for issuing a stop command to stop a supply of current to the electric motor when the current flowing through the electric motor exceeds a preselected value, and second means for issuing a start command to start the supply of current to the electric motor to prevent the current flowing through the electric motor from dropping to zero after the first means issues the stop command.

10. A combination according to claim 9; wherein the control unit comprises third means for repeating the issuance of the stop command by the first means and the start command by the second means.

11. A combination according to claim 8; wherein the electric working machine comprises a walk-behind lawn mower.

12. A combination according to claim 8; wherein the electric working machine comprises a snow removing machine.

* * * * *